United States Patent
Kim et al.

(10) Patent No.: US 12,531,250 B2
(45) Date of Patent: Jan. 20, 2026

(54) CURRENT COLLECTOR FOR ELECTRODE

(71) Applicant: U&S ENERGY, INC., Cheonan-si (KR)

(72) Inventors: Kyung Joon Kim, Daejeon-si (KR); Seung Ho Choi, Daejeon-si (KR); Young Hun Jin, Gyeryong-si (KR)

(73) Assignee: U&S ENERGY, INC., Cheoan-si (KR)

( * ) Notice: Subject to any disclaimer, the term of this patent is extended or adjusted under 35 U.S.C. 154(b) by 554 days.

(21) Appl. No.: 17/919,161

(22) PCT Filed: Nov. 5, 2021

(86) PCT No.: PCT/KR2021/015962
§ 371 (c)(1),
(2) Date: Oct. 14, 2022

(87) PCT Pub. No.: WO2022/108204
PCT Pub. Date: May 27, 2022

(65) Prior Publication Data
US 2023/0170492 A1 Jun. 1, 2023

(30) Foreign Application Priority Data
Nov. 18, 2020 (KR) .......... 10-2020-0154532

(51) Int. Cl.
*H01M 4/78* (2006.01)
*H01M 4/66* (2006.01)
*H01M 10/42* (2006.01)

(52) U.S. Cl.
CPC ....... *H01M 4/668* (2013.01); *H01M 10/4235* (2013.01)

(58) Field of Classification Search
CPC ............ H01M 4/668; H01M 10/4235; H01M 4/661; H01M 4/70; H01M 2200/103; H01M 4/66; H01M 4/667; H01M 10/42; H01M 50/581; H01M 50/583; Y02E 60/10
See application file for complete search history.

(56) References Cited

U.S. PATENT DOCUMENTS

2013/0011742 A1* 1/2013 Park .................. H01M 4/667
429/234

FOREIGN PATENT DOCUMENTS

| CN | 203895532 U | 10/2014 |
|---|---|---|
| EP | 2830126 B1 | 7/2019 |
| EP | 4123763 A1 | 1/2023 |
| JP | 106187996 A | 7/1994 |
| JP | 2004-311073 A | 11/2004 |
| JP | 2007-026913 A | 2/2007 |
| KR | 1019970051620 A | 7/1997 |
| KR | 20130119011 A | 10/2013 |
| KR | 102097444 B | 4/2020 |
| KR | 102097444 B1 | 4/2020 |
| KR | 20200047638 A | 5/2020 |
| KR | 20200099314 A | 8/2020 |

* cited by examiner

*Primary Examiner* — Cynthia K Walls
(74) *Attorney, Agent, or Firm* — NKL LAW; Jae Youn Kim

(57) ABSTRACT

According to an embodiment of the present invention, a current collector for an electrode comprises a polymer film, and a conductive material provided on at least one surface of an upper surface or a lower surface of the polymer film, wherein the conductive material may include a relatively small thickness portion and a relatively large thickness portion.

5 Claims, 13 Drawing Sheets

CURRENT COLLECTOR FOR ELECTRODE

TECHNICAL FIELD

The present invention relates to a current collector for an electrode, and more particularly, to a current collector for an electrode in which a portion of a metal of a conductive material provided on a polymer film is formed thinner than other portions, thereby exhibiting an electrochemical fuse function such as preventing a battery from overheating or blocking a short-circuit current path during a short circuit.

BACKGROUND ART

The demand for secondary batteries is rapidly increasing, and among these secondary batteries, a lithium secondary battery that exhibits high energy density and operating potential and has a low self-discharge rate has been commercialized.

The lithium metal secondary battery is a first commercialized secondary battery, and uses a lithium metal as a negative electrode(anode). However, due to volume expansion of a cell, gradual decreases in capacity and energy density, a short circuit caused by a dendrite continuous growth, a decrease in cycle life, and cell stability problems (explosion and ignition) caused by lithium dendrites formed on a surface of a lithium metal negative electrode(anode), the lithium metal secondary battery stopped in production after only a few years of commercialization. Accordingly, a carbon-based negative electrode(anode) that is more stable and may stably store lithium in an ion state in a lattice or empty space was used instead of the lithium metal, and the use of the carbon-based negative electrode(anode) leads to full-scale commercialization and dissemination of the lithium secondary battery.

Until now, the lithium secondary battery has been mainly made of carbon-based or noncarbon-based negative electrode materials, and the development of most negative electrode materials has been concentrated on carbon-based materials (graphite, hard carbon, soft carbon, etc.) and noncarbon-based materials (silicon, tin, titanium oxide, etc.).

Meanwhile, recently, as portable electronic devices and information communication devices have been miniaturized, the use of lithium secondary battery as an ultra-small power supply system for driving the devices is greatly expected.

Moreover, in recent years, the development and research of polymer-based electronic devices and elements using advantages such as flexibility, low price, and ease of manufacture have been actively conducted. Therefore, in order to be used for miniaturized devices, it is necessary to reduce the thickness or weight of the lithium secondary battery while maintaining the energy density or performance of the lithium secondary battery.

In addition, even if the thickness or weight of the lithium secondary battery is reduced, the safety of the lithium secondary battery should be improved by blocking or destroying a current path when a short circuit occurs.

In particular, in the case of a large-capacity lithium secondary battery capable of storing energy of 2 Ah or more, a battery safety technology capable of reducing or blocking the short-circuit current when the short-circuit occurs is further required.

The present applicants have proposed the present invention in order to solve the problems.

DISCLOSURE

Technical Problem

An object of the present invention is to provide a current collector for an electrode capable of preventing temperature rise and increasing the stability of a battery by functioning as a fuse when an internal or external short circuit occurs while reducing the thickness or weight as compared with a foil-made current collector.

Another object of the present invention is to provide a current collector for an electrode capable of preventing the failure to block a short-circuit current because a current collector for a positive electrode(a cathode) comes into surface contact with a current collector for an opposite electrode when a short circuit occurs in a large-sized lithium secondary battery.

Yet another object of the present invention is to provide a current collector for an electrode capable of preventing the failure to block a short-circuit current because an aluminum conductive material is not completely corroded or broken in a thickness direction when a short circuit occurs.

Technical Solution

According to an embodiment of the present invention, a current collector for an electrode may include a polymer film, and a conductive material provided on at least one surface of an upper surface and a lower surface of the polymer film, in which the conductive material may include a relatively small thickness portion and a relatively large thickness portion.

The conductive material may include a relatively small thickness portion, and perform an electrochemical fuse function or a short-circuit current blocking function in the small thickness portion.

The conductive material may include a small thickness portion formed along a surface direction of the polymer film or include a small thickness portion formed along a direction vertical to the surface direction of the polymer film.

The small thickness portion of the conductive material may be formed on a horizontal surface of an engraved portion recessed from the surface of the conductive material or on a vertical surface of an embossed portion protruding from the surface thereof.

The polymer film may include the engraved portion recessed from the surface of the polymer film or include the embossed portion protruding from the surface of the polymer film.

A conductive material formed on the horizontal surface of the engraved portion recessed from the surface of the polymer film or a conductive material formed on the vertical surface of the embossed portion protruding from the surface of the polymer film may be formed thinner than other portions.

The embossed portion protruding from the surface of the polymer film may include a stepped portion formed on the polymer film or include a polymer attached to the surface of the polymer film.

The small thickness portion of the conductive material may be formed at a thickness of 70% or less as compared with the thicknesses of other portions.

The small thickness portion of the conductive material may be formed at a thickness of 0.4 μm or less.

The small thickness portion of the conductive material may be formed in a closed curve or closed polygonal shape when the conductive material provided on the polymer film is viewed from the top.

Advantageous Effects

According to the present invention, the current collector for the electrode uses a polymer film made of an insulator instead of a metal foil, and a layer coated or plated with a conductive material is formed on the surface of the polymer film, thereby reducing the thickness as compared with a metal foil-made current collector.

Further, according to the present invention, the current collector for the electrode has a greater resistance than the resistance of the metal foil-made current collector when a short circuit occurs and a current flow may be interrupted due to an electrochemical reaction in a small thickness portion of the conductive material formed on the surface of the polymer film to reduce a short-circuit current and prevent the temperature of the battery from rising when the short circuit occurs, thereby improving the safety of the battery.

Further, according to the present invention, in the current collector for the electrode, the conductive material is completely corroded or broken over the entire thickness of the relatively small thickness portion of the aluminum conductive material when the short circuit occurs to increase the resistance, thereby blocking a short-circuit current.

Further, according to the present invention, it is possible to improve the safety while increasing the energy density of a secondary battery, and to secure the safety of a large-capacity secondary battery when a short circuit occurs.

BEST MODE

Figure 1:
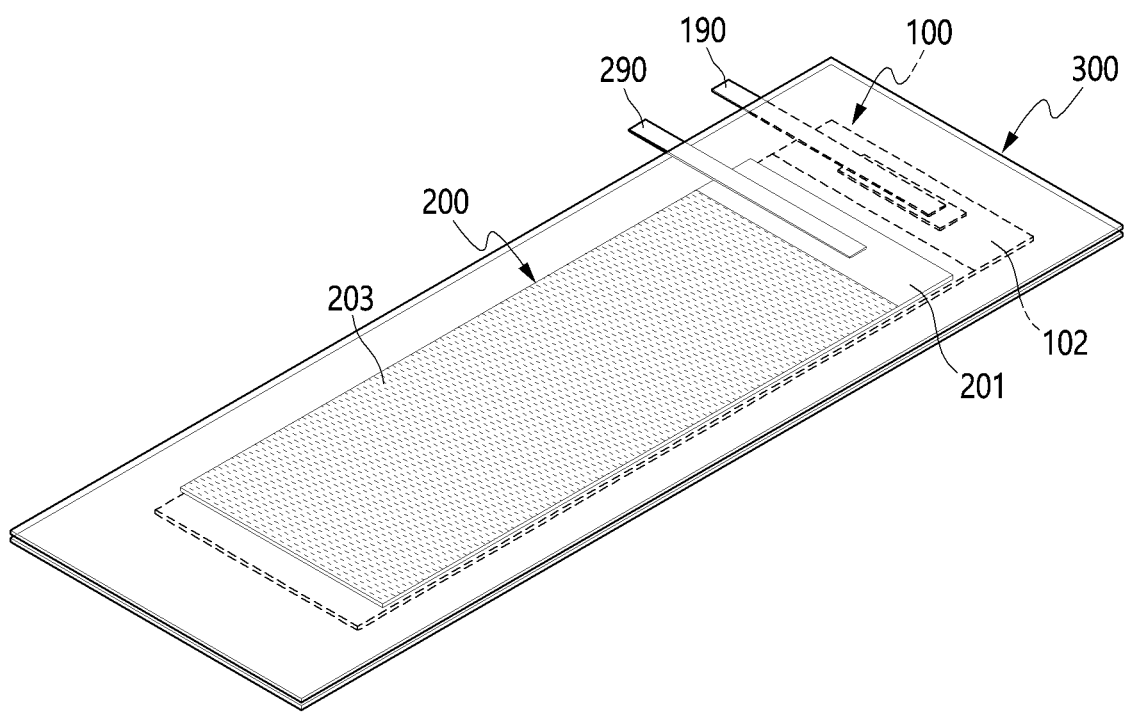
FIG. 1 is a perspective view illustrating an electrode assembly including a current collector for an electrode according to an embodiment of the present invention.

Hereinafter, embodiments of the present invention will be described in detail with reference to the accompanying drawings. However, embodiments of the present invention are not limited or restricted thereto. Like reference numerals illustrated in the respective drawings designate like members.

Figure 2:
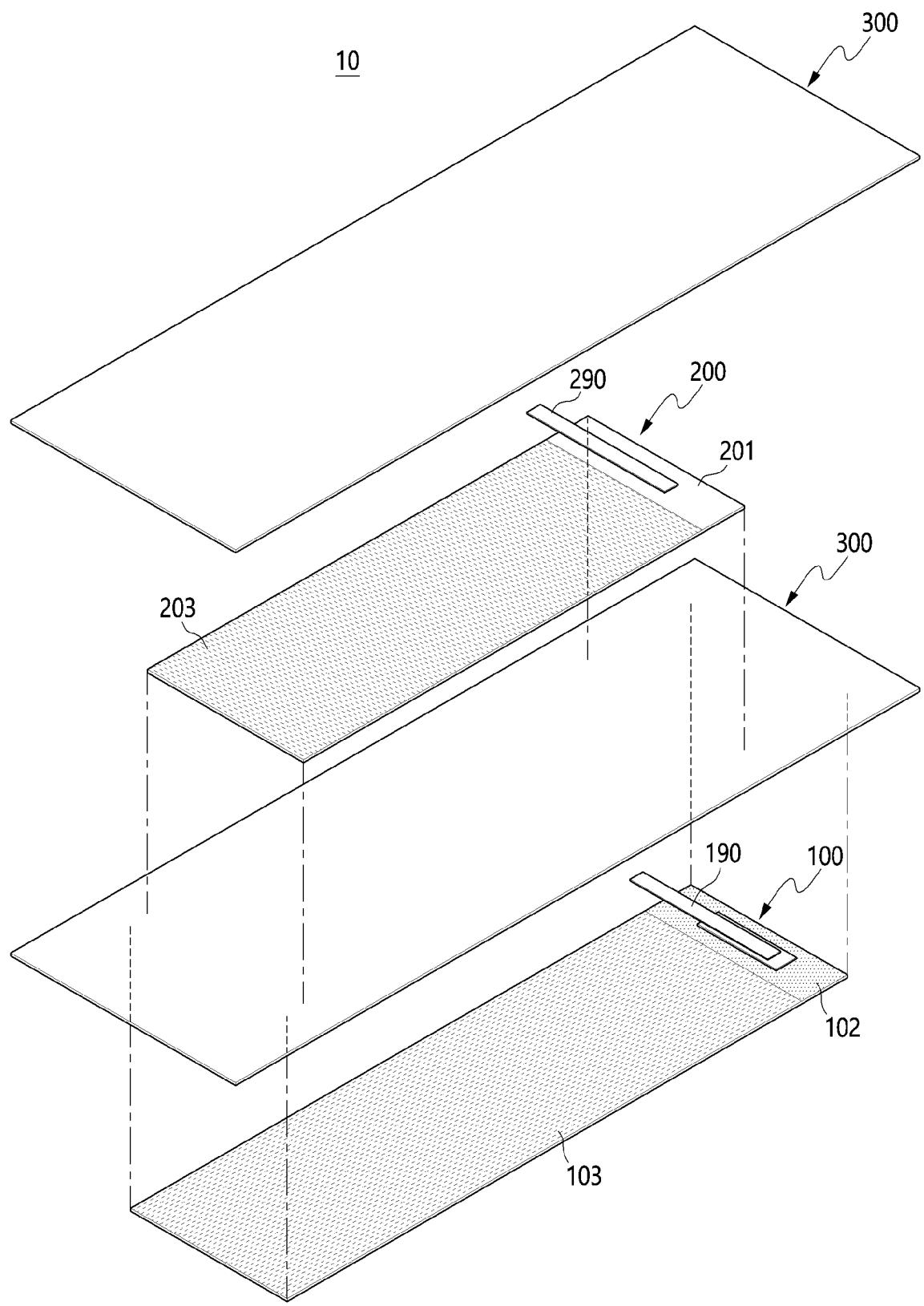
FIG. 2 is an exploded perspective view of an electrode assembly according to an embodiment of the present invention.
Figure 3:
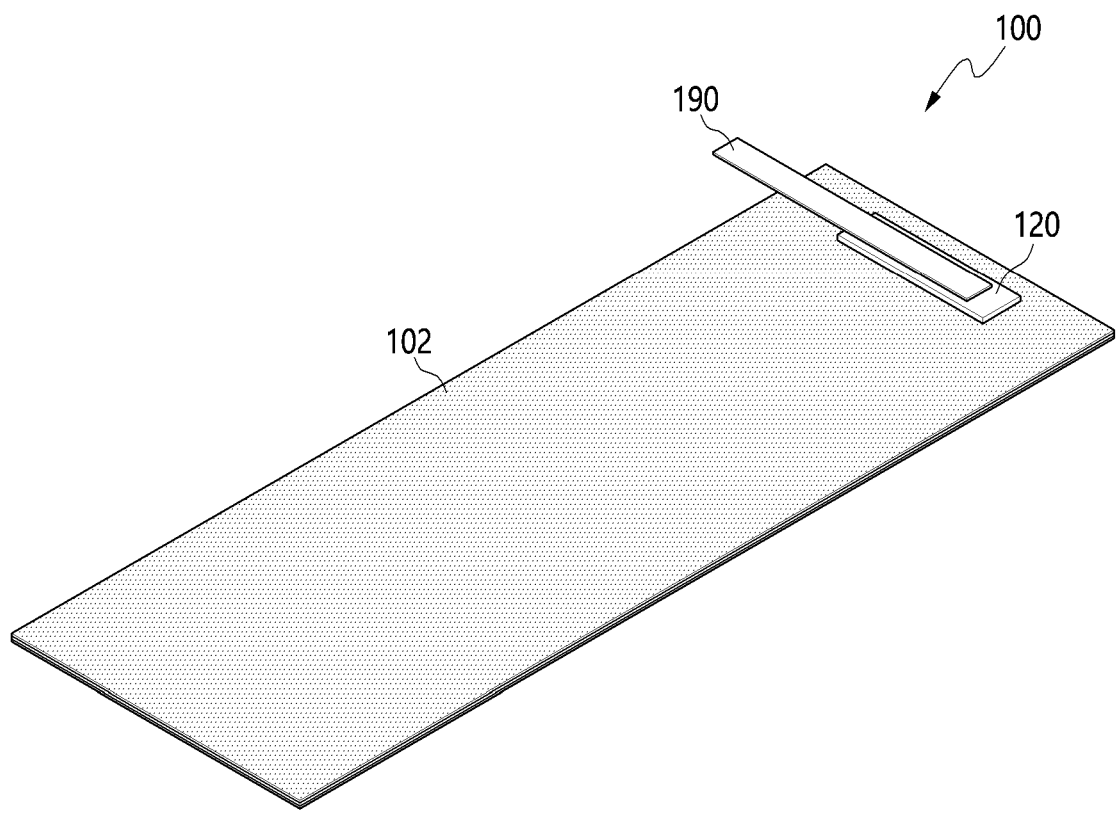
FIG. 3 is a perspective view illustrating a current collector for an electrode according to an embodiment of the present invention.
Figure 4:
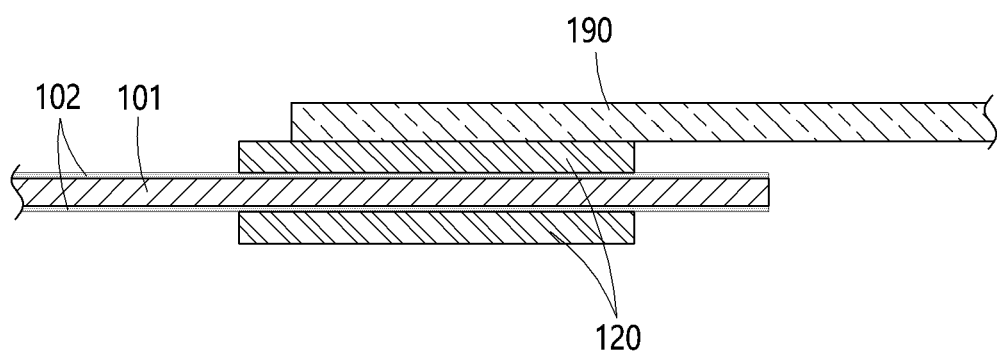
FIG. 4 is a cross-sectional view illustrating a state in which a lead tab is connected to a current collector for an electrode according to an embodiment of the present invention.
Figure 5:
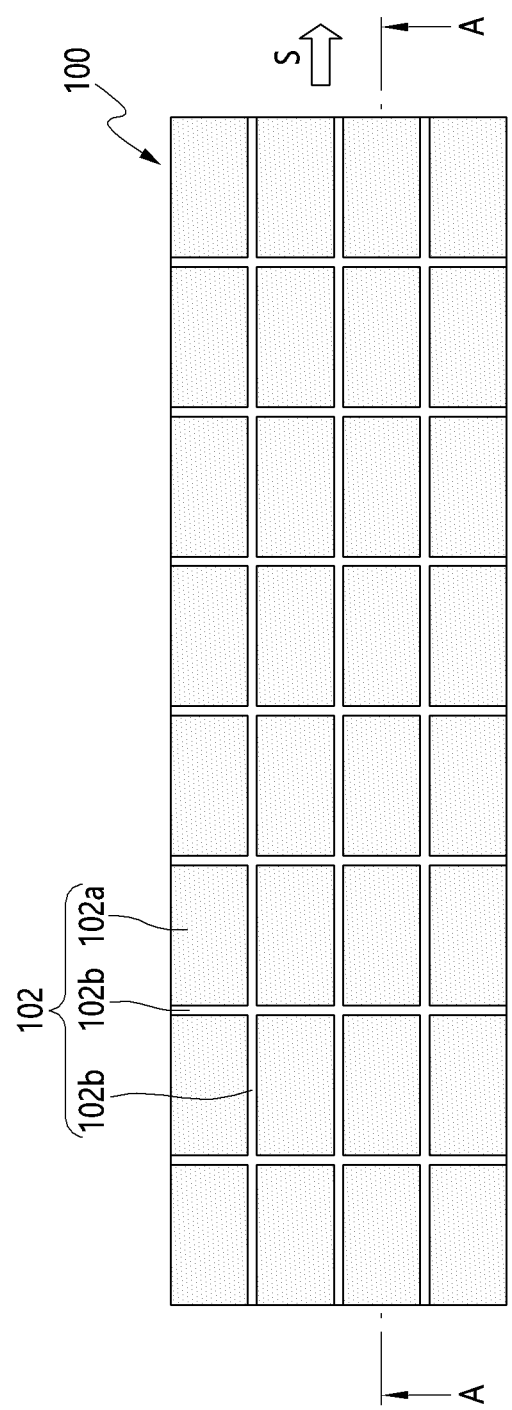
FIGS. 5 and 6 are a plan view and a cross-sectional view of a current collector for an electrode according to an embodiment of the present invention.
Figure 6:
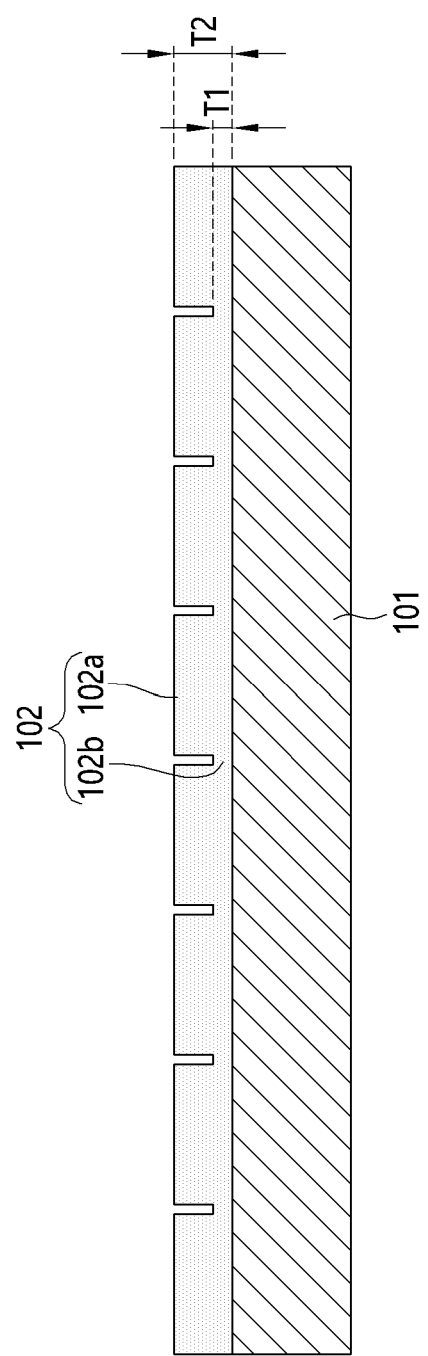
Figure 7:
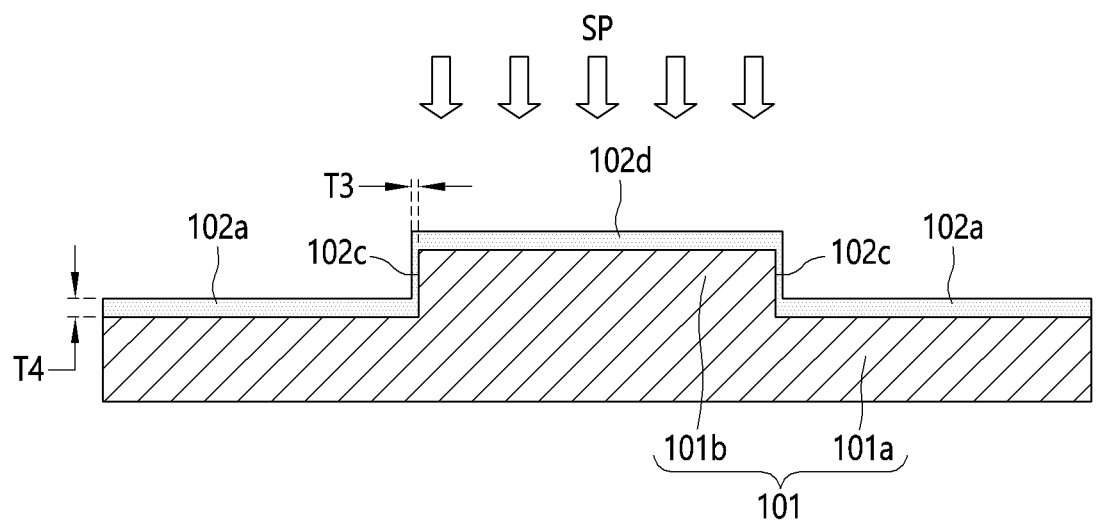
FIGS. 7 and 8 are cross-sectional views of a current collector for an electrode according to another embodiment of the present invention.
Figure 8:
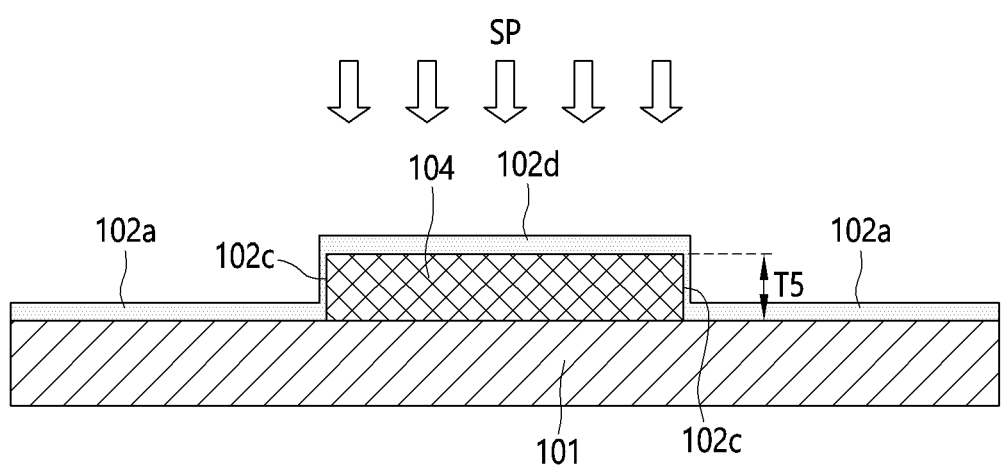

FIG. 1 is a perspective view illustrating an electrode assembly including a current collector for an electrode according to an embodiment of the present invention, FIG. 2 is an exploded perspective view of an electrode assembly according to an embodiment of the present invention, FIG. 3 is a perspective view illustrating a current collector for an electrode according to an embodiment of the present invention, FIG. 4 is a cross-sectional view illustrating a state in which a lead tab is connected to a current collector for an electrode according to an embodiment of the present invention, FIGS. 5 and 6 are a plan view and a cross-sectional view of a current collector for an electrode according to an embodiment of the present invention, and FIGS. 7 and 8 are cross-sectional views of a current collector for an electrode according to another embodiment of the present invention.

FIGS. 1 and 2 illustrate an electrode assembly 10 including a current collector 100 for an electrode according to the present invention. In FIGS. 1 and 2, the current collector 100 for the electrode according to the present invention is a current collector for a positive electrode(cathode). In order to be used for the electrode assembly 10, a positive electrode active material 103 needs to be applied on the surface of the current collector 100 for the electrode.

Meanwhile, in a current collector 200 for a negative electrode(anode), a negative electrode active material 203 is applied on a negative electrode metal foil 201 and a negative electrode lead tab 290 may be connected to one end of a longitudinal direction.

A separator 300 may be disposed between the current collector 200 for the negative electrode(anode) and the current collector 100 for the electrode (positive electrode or cathode) according to the present invention. In a state illustrated in FIG. 2, the current collector 200 for the negative electrode(anode) and the current collector 100 for the positive electrode(cathode) are sequentially stacked up and down with the separator 300 interposed therebetween to become the electrode assembly 10 as illustrated in FIG. 1.

Hereinafter, for convenience of description, the current collector 100 for the positive electrode(cathode) is referred to as the current collector for the electrode.

FIG. 3 illustrates the current collector 100 for the electrode according to an embodiment of the present invention. The current collector 100 for the electrode does not use a metal foil, unlike the current collector 200 for the negative electrode(anode) described above.

As illustrated in FIG. 3, since the current collector 100 for the electrode according to an embodiment of the present invention has a large resistance value greater than the resistance of a current collector made of a metal foil, a limit current value of a current flowing through the current collector may be adjusted and the current flow may be interrupted by damage to the polymer film, so that it is possible to reduce a short-circuit current or prevent heat generation when an internal short circuit of a secondary battery occurs.

A lithium secondary battery having the current collector 100 for the electrode according to the present invention may have a characteristic or concept of a max current limited battery (MCLB). Hereinafter, the current collector for the electrode according to the present invention that enables the implementation of MCLB will be described.

The current collector 100 for the electrode according to an embodiment of the present invention is the current collector for the positive electrode(cathode) and has a higher resistance value than the resistance of a current collector for a positive electrode(cathode) of a conventional battery, that is, the current collector for the positive electrode(cathode) formed of the metal foil. Accordingly, it is possible not only to adjust a limit current, but also to reduce a short-circuit current by blocking or collapsing the current path during the internal short circuit or to reduce the heat generated during the short-circuit, thereby increasing the safety of the battery.

The current collector 100 for the electrode according to an embodiment of the present invention is characterized by using a polymer film 101 as a basic material without using a metal foil, and applying or coating a small thickness metal on the polymer film 101.

Referring to FIGS. 3 and 4, the current collector 100 for the electrode according to an embodiment of the present invention may include a polymer film 101; and a conductive material 102 provided on at least one of upper and lower surfaces of the polymer film 101.

Here, since the conductive material 102 may function as an electrochemical fuse to have a short circuit prevention function. The electrochemical properties of the conductive material 102 will be described below.

Meanwhile, at least one metal piece 120 may be provided on the conductive material 102 provided on at least one of the upper surface and the lower surface of the polymer film 101. That is, the conductive material 102 may be provided between the polymer film 101 and the metal piece 120.

The polymer film 101 may be provided in a band shape to have a predetermined length. Here, the polymer film 101 may be provided with a non-conductive material such as polyethylene (PE), polypropylene (PP), polybutylene terephthalate (PBT), polyimide (PI), or polyethylene terephthalate (PET).

The polymer film 101 has a thickness of 50 μm or less, preferably having a thickness of 1.4 μm or more and 50 μm or less. The current collector 100 for the electrode according to an embodiment of the present invention may reduce the thickness or weight of the battery as compared with a case of using a conventional metal foil current collector. However, by using a non-conductive polymer film 101 having a thickness of 1.4 μm or more and 50 μm or less as the basic configuration of the current collector 100, it is possible to reduce the overall thickness or weight of a lithium secondary battery including the current collector 100 for the electrode according to an embodiment of the present invention.

On the other hand, the metal pieces 120 are positioned on an opposite surface to the surface to which a lead tab 190 is attached or on both surfaces of the polymer film 101, and the lead tab 190 is welded and fixed to the metal piece 120. However, if the polymer film 101 is not melted at a temperature lower than a welding temperature of the lead tab 190, the lead tab 190 cannot be bonded. Therefore, it is preferred that the polymer film 101 has a melting point enough to be melted in the process of welding the lead tab 190.

Referring to FIGS. 3 and 4, the metal piece 120 may be provided so as to be in contact with or electrically connected to the conductive material 102 provided on the surface of the polymer film 101. As illustrated in FIG. 4, the metal pieces 120 may be provided on both surfaces of the polymer film 101 or only on one surface of the polymer film 101.

The metal piece 120 may serve to secure a position for welding the lead tab 190 on the polymer film 101. That is, the metal piece 120 may serve as a connection portion of the lead tab 190.

The metal piece 120 is preferably formed to have a thickness of 5 μm or more.

As described above, the metal piece 120 preferably has a shape of a metal thin film or a metal foil having a thickness of 5 μm or more, but is not necessarily limited to such a shape. That is, the metal piece 120 may be provided in the form of a thin film, a foil, or a mesh.

The metal piece 120 is preferably made of an aluminum foil or SUS 316L foil.

Meanwhile, the current collector 100 for the electrode according to an embodiment of the present invention may include the polymer film 101 and/or the conductive material 102 provided on the surface of the polymer film 101. In this case, the surface of the polymer film 101 on which the conductive material 102 is provided may include an engraved portion or an embossed portion.

When the current collector 100 for the electrode is the current collector for the positive electrode(cathode), the conductive material 102 may be made of an aluminum (Al) metal. The conductive material 102 may be referred to as a conductive layer forming the outermost surface of the current collector 100 for the electrode.

The conductive material 102 may be formed to adjust or lower a limit current or a maximum current of the current collector 100 for the electrode. In other words, the conductive material 102 is an aluminum metal that is plated or coated on an engraved surface or an embossed surface of the polymer film 101 to control the conductivity of the current collector 100 for the electrode, and the conductive material 102 may also be referred to as a conductive layer in the case of focusing on a state where the conductive material 120 is plated or coated on the surface of the polymer film 101 and/or the metal piece 120. Hereinafter, it is noted that the conductive material 102 is a concept including a conductive layer.

By controlling the coating amount or the coating thickness of the conductive material 102 to be plated (coated) or provided on the surface of the polymer film 101, it is possible to control or lower a maximum amount of current flowing through the current collector 100 for the electrode, thereby increasing the safety of the lithium secondary battery and securing the safety of the battery during a short circuit.

In other words, the limit current or the maximum current flowing through the current collector 100 for the electrode may be controlled by the thickness or amount of the conductive material 102 formed on the surface of the polymer film 101. In this way, the nature or concept of a max current limited battery (MCLB) of the lithium secondary battery may be implemented by the conductive material 102 of the current collector 100 for an electrode according to an embodiment of the present invention.

In addition, when a physical internal short circuit or external short circuit occurs, the polymer film 101 may be melted to interrupt rapid generation of the current, thereby improving the safety of the battery.

The conductive material 102 may be formed on the surface of the polymer film 101 by various methods. For example, an aluminum metal as the conductive material 102 may be formed on the surface of the polymer film 101 by sputtering or evaporation coating. Since aluminum is easily oxidized, it is not easy to form the conductive material 102 on the surface of the polymer film 101 by electroplating.

Since the conductivity of the current collector 100 for the electrode may be controlled or the safety of the battery may be secured by the amount (weight) or thickness of the conductive material 102 to be coated, it is necessary to use a method of controlling or adjusting the thickness or weight of the conductive material 102 when plating or coating.

The conductive material 102 may be formed on only one surface or both surfaces of the polymer film 101. At this time, the conductive material 102 is preferably formed at a thickness of 0.5 μm based on a minimum cross section and 2.5 μm based on a maximum cross section.

Since the current collector 100 for the electrode according to an embodiment of the present invention enables the current flow by the conductive material 102, the conductive material 102 needs to be well maintained to be coated on the surface of the polymer film 101. To this end, it is preferred to increase the bonding force between the conductive material 102 and the polymer film 101 by surface-treating the polymer film 101.

When the bonding force between the conductive material 102 and the polymer film 101 is not good, the conductive material 102 may be separated or deviated from the surface of the polymer film 101 in a state in which an electrolyte is injected, so that it is important to increase the bonding force between the conductive material 102 and the polymer film 101.

A surface treatment may be formed on the surface of the polymer film 101 to increase the adhesion or bonding force with the conductive material 102.

It is preferred to corona-treat the surface of the polymer film 101 in order to increase the bonding force between the conductive material 102 and the polymer film 101.

Meanwhile, the current collector 100 for the electrode according to an embodiment of the present invention may include the lead tab 190 for connection with an external device.

In a conventional metal foil current collector, the lead tab may be directly welded to the metal foil, but the current collector 100 for the electrode according to an embodiment of the present invention has the polymer film 101 as a configuration corresponding to the conventional metal foil, so that it is impossible to directly weld the lead tab to the polymer film 101. In the current collector 100 for the electrode according to an embodiment of the present invention, the metal piece 120 is additionally positioned on both surfaces of the polymer film 101 or on an opposite surface of the surface to which the lead tab 190 is connected, and the lead tab 190 is welded to the metal piece 120, thereby solving the problems.

In the current collector 100 for the electrode according to an embodiment of the present invention, the lead tab 190 may be welded to the metal piece 120 by ultrasonic welding, laser welding, or spot welding.

As illustrated in FIG. 4, the lead tab 190 may be connected to any one of the metal pieces 120 provided on both upper and lower surfaces of the polymer film 101. Although not illustrated, the lead tab 190 is connected to one surface of the polymer film 101 and the metal piece 120 may also be provided on the other surface of the polymer film 101 facing the lead tab 190. At this time, the conductive material 102 is positioned between the polymer film 101 and the metal piece 120 or between the polymer film 101 and the lead tab 190. That is, after the conductive materials 102 are first applied or coated on the upper and lower surfaces of the polymer film 101, the metal piece 120 may be provided to be positioned on the conductive material 102 or provided to be in contact with the conductive material 102 so as to be electrically connected to the conductive material 102.

When the lead tab 190 is welded to any one of the metal pieces 120 provided on both surfaces of the polymer film 101, the polymer film 101 is melted, so that the metal pieces 120 provided on both surfaces of the polymer film 101 are connected to each other. As a result, the lead tab 190 may be electrically connected to the conductive materials 102 provided on both surfaces of the polymer film 101 at the same time.

While the metal piece 120 and the conductive material 102 are provided on both upper and lower surfaces of the polymer film 101, the lead tab 190 is ultrasonic-welded, laser-welded, or spot-welded to the metal piece 120 provided on the upper surface of the polymer film 101 so that a portion of the polymer film 101 may be melted. If the welding heat generated when welding the lead tab 190 is higher than a melting point of the polymer film 101, the polymer film 101 may be melted during the welding process.

As such, since the polymer film 101 does not exist in the portion where the polymer film 101 is melted, the upper and lower metal pieces 120 may be in direct contact with each other. At this time, since the metal piece 120 is also melted by the welding heat, the upper and lower metal pieces 120 are bonded to each other. Therefore, since the upper and lower metal pieces 120 are directly melt-bonded to each other in the portion where the polymer film 101 is melted and then disappears, the lead tab 190 welded to any one metal piece 120 may be electrically connected to the conductive materials 102 formed on the upper and lower surfaces of the polymer film 101 as well as the upper and lower metal pieces 120.

In the current collector 100 for an electrode according to an embodiment of the present invention, even if a portion of the polymer film 101 is melted by the welding heat, the metal piece 120 is maintained to be connected to the polymer film 101, so that the lead tab 190 can be connected.

However, in some cases, the lead tab 190 may be welded to the metal piece 120 even while the polymer film 101 is not melted.

Meanwhile, the current collector 100 for the electrode according to an embodiment of the present invention is a current collector used as a positive electrode(cathode) of a secondary battery, and unlike a conventional current collector made of a metal foil, the safety of the secondary battery may be improved. This is because the conductive material 102 applied or coated on the polymer film 101 has a short-circuit current blocking function like a fuse.

In general, when an internal short circuit or an external short circuit occurs in the secondary battery, a heat generation phenomenon occurs in which the temperature of the secondary battery increases due to the short-circuit current, and there is a risk that the battery explodes due to heat generation. On the other hand, in the case of the secondary battery using the current collector 100 for the electrode according to an embodiment of the present invention as a positive electrode(cathode), even if the internal short circuit or the external short circuit occurs, the temperature of the secondary battery is prevented from rising and the short-circuit current is blocked, thereby securing the safety of the battery.

The conductive material 102 applied or coated on the polymer film 101 functions as a current path, and if the conductive material 102 reacts with an electrolyte to be smashed as if being corroded when the short circuit occurs, the current path is blocked, so that a short-circuit current no longer flows.

In the case of the secondary battery including the current collector 100 for the positive electrode(cathode) according to an embodiment of the present invention, the reason for blocking the current path when the short circuit occurs is that a relatively small thickness portion exists in the conductive material 102 formed on the surface of the polymer film 101, an electrochemical reaction occurs in the small thickness portion, and the resistance is increased, thereby blocking the path of the short-circuit current.

Referring to FIGS. 5 and 6, the current collector 100 for the electrode according to an embodiment of the present invention includes a polymer film 101; and a conductive material 102 provided on at least one surface of an upper surface and a lower surface of the polymer film 101, and the conductive material 102 may have an electrochemical fuse function or a short-circuit current blocking function.

As described above, the conductive material 102 includes a relatively small thickness portion 102*b*, and may perform an electrochemical fuse function or a short-circuit current blocking function in the small thickness portion 102*b*.

FIG. 5 is a plan view of the conductive material 102 provided on the upper surface of the polymer film 101 when viewed from the top, and FIG. 6 is a cross-sectional view taken along line A-A of FIG. 5. Referring to FIGS. 5 and 6, the conductive material 102 provided on the upper surface of the polymer film 101 having a band shape along a transfer direction S may include a relatively small thickness portion 102*b* and a relatively large thickness portion 102*a*.

Most of the conductive material 102 may be the relatively large thickness portion 102*a*, and the remaining portion thereof may be the relatively small thickness portion 102*b*. Referring to FIG. 5, the small thickness portion 102*b* of the conductive material 102 may be uniformly formed in a lattice shape, and the small thickness portion 102*b* may have the same thickness.

Unlike the case of FIGS. 5 and 6, instead of uniformly forming the small thickness portion 102*b* over the entire conductive material 102, the small thickness portion 102*b* may also be formed only on a part of the conductive material 102. For example, the conductive material 102 may be formed to have a small thickness only at a portion of the conductive material 102 to which the lead tab 190 is connected.

When the internal short circuit occurs in the lithium secondary battery including the current collector 100 for the electrode according to an embodiment of the present invention shown in FIGS. 5 and 6, an electrochemical reaction may easily occur in the small thickness portion 102*b* of the conductive material 102.

When the short circuit occurs in the lithium secondary battery using the current collector 100 for the electrode according to an embodiment of the present invention, the potential of the current collector 100 for the positive electrode(cathode) applied or coated on the polymer film 101 with the aluminum metal as the conductive material 102 is lowered to a negative potential (i.e., <0.3 volt, a negative electrode Li metal). As a result, when the conductive material 102 reacts with the electrolyte, the conductive material 102 is broken as if corroded, thereby blocking the short-circuit current.

The conductive material 102 applied or coated on the polymer film 101 functions as a current path, and when the conductive material 102 reacts with an electrolyte to be smashed as if being corroded when the short circuit occurs, the current path is blocked, so that a short-circuit current no longer flows.

When the short circuit occurs in the lithium secondary battery including the current collector 100 for the electrode according to an embodiment of the present invention, the conductive material 102 reacts with the electrolyte to be corroded or broken along a thickness direction over the entire thickness of the conductive material 102, thereby blocking the path of the short-circuit current.

However, in the large thickness portion 102*a* of the conductive material 102, although the conductive material 102 is broken to some extent along the thickness direction (depth direction) thereof, the resistance is not large, so that the current may still flow. Therefore, even if the short circuit occurs in the large thickness portion 102*a* of the conductive material 102, the conductive material 102 is not corroded or broken in the thickness direction over the entire thickness, so that the short-circuit current path is not blocked.

However, in the case of the current collector 100 for the electrode according to an embodiment of the present invention, the relatively small thickness portion 102*b* of the conductive material 102 exists, and the small thickness portion 102*b* of the conductive material 102 is easily completely corroded or broken along the thickness direction over the entire thickness thereof when the short circuit occurs. As a result, since the resistance increases in this portion, it is possible to block the path of the short-circuit current.

As such, the conductive material 102 of the current collector 100 for the electrode according to an embodiment of the present invention exhibits an electrochemical fuse function or a short-circuit current blocking function in the relatively small thickness portion 102*b* to prevent the temperature of the battery from rising when the short circuit occurs and block the short-circuit current, thereby securing the safety of the battery.

Referring to FIGS. 5 and 6, the small thickness portion 102*b* of the conductive material 102 is formed along a surface direction of the polymer film 101. Referring to FIG. 6, the small thickness portion 102*b* of the conductive material 102 is formed along an upper surface (surface) direction of the polymer film 101. As illustrated in FIGS. 5 and 6, the conductive material 102 may include an engraved portion 102*b* recessed from its surface, and since the thickness of the engraved portion 102*b* is small, this portion may block the short-circuit current.

Here, after the large thickness portion 102*a* of the conductive material 102 is formed on the surface of the polymer film 101, the small thickness portion 102*b* of the conductive material 102 may be formed by scraping or removing the conductive material 102 by a predetermined depth. Alternatively, the small thickness portion 102*b* may also be formed by laser patterning on the large thickness portion 102*a* of the conductive material 102. In addition, when the conductive material 102 is coated or deposited on the surface of the polymer film 101, the large thickness portion 102*a* and the small thickness portion 102*b* may also be collectively formed.

In the case of the current collector 100 for the electrode as illustrated in FIG. 5, when the short circuit occurs, the small thickness portion 102*b* is completely corroded or broken along an edge of any one lattice portion of a lattice-shaped portion of the conductive material 102, thereby effectively blocking the current from flowing to the other lattice portion. That is, by electrically isolating the lattice portion when the short circuit occurs, it is possible to block the short-circuit current from flowing over the entire conductive material 102.

The small thickness portion 102*b* of the conductive material 102 may be formed in a closed curve or closed polygonal shape when the conductive material 102 provided on the polymer film 101 is viewed from the top. For example, as illustrated in FIG. 5, the small thickness portion 102b is formed in a quadrangular shape. As such, only when the small thickness portion 102b is formed in the closed curve or closed polygonal shape, it is possible to block the current flowing through the conductive material 102 surrounded by the small thickness portion 102b from flowing to the other portion when the short circuit occurs.

The small thickness portion 102b of the conductive material 102 may have a thickness of 70% or less compared to the thickness of the other portion 102a. Referring to FIG. 6, if the thickness of the small thickness portion 102b of the conductive material 102 is T1 and the thickness of the large thickness portion 102a is T2, the conductive material 102 may be preferably formed to have T1/T2 of 0.7 or less. In addition, the small thickness portion 102b of the conductive material 102 is preferably formed to have a thickness of 0.4 µm or less.

The small thickness portion of the conductive material 102 may be formed to be engraved and also to be embossed from the surface of the conductive material 102 as illustrated in FIGS. 5 and 6.

FIGS. 7 and 8 illustrate cross-sectional views of the current collector for the electrode according to another embodiment of the present invention. In both cases illustrated in FIGS. 7 and 8, an embossed portion 102d protruding from the surface of the conductive material 102 is included.

In the case of FIG. 7, the polymer film 101 includes a stepped portion 101b and a non-stepped portion 101a. The stepped portion 101b is a portion protruding from the surface of the non-stepped portion 101a. As such, when the conductive material 102 is coated or deposited on the surface of the polymer film 101 including the stepped portion 101b and the non-stepped portion 101a, the conductive materials 102 may be formed not only on the surfaces of the non-stepped portion 101a and the stepped portion 101b, but also on the thickness surface of the stepped portion 101b.

When the conductive material 102 is coated on the surface of the polymer film 101 by sputtering, the conductive material 102 is sputtered from top to bottom in a direction vertical to the surface of the polymer film 101. In FIG. 7, an arrow SP indicates a sputtering direction of the conductive material 102. The sputtered conductive materials 102 are coated on the surfaces of the non-stepped portion 101a and the stepped portion 101b and a side surface (thickness surface) of the stepped portion 101b of the polymer film 101. At this time, the conductive material 102 coated on the side surface of the stepped portion 101b flows down toward the surface of the non-stepped portion 101a. Accordingly, the thickness of the conductive material 102c formed on the side surface of the stepped portion 101b is smaller than the thicknesses of the conductive material 102a formed on the surface of the non-stepped portion 101a and the conductive material 102d formed on the surface of the stepped portion 101b.

When the thickness of the conductive material 102a formed on the surface of the non-stepped portion 101a of the polymer film 101 and the thickness of the conductive material 102d formed on the surface of the stepped portion 101b are T4 and the thickness of the conductive material 102c formed on the side surface of the stepped portion 101b is T3, T4 is greater than T3.

Meanwhile, in FIG. 8, the shape of the polymer film 101 is different from that of FIG. 7. In the case of FIG. 7, the stepped portion 101b is also formed of the polymer film 101, but in FIG. 8, there is a difference in that the stepped portion 104 is not formed of the polymer film 101.

The current collector 100 for the electrode illustrated in FIG. 8 may include a polymer 104 attached to the surface of the polymer film 101. The polymer 104 is attached to the surface of the polymer film 101 to form a stepped portion, and an adhesive (not illustrated) for attachment may be positioned between the polymer 104 and the polymer film 101. Here, a thickness T5 of the polymer 104 including the adhesive is preferably the same as the thickness of the stepped portion 101b of FIG. 7.

As illustrated in FIG. 7, the thickness of the conductive material 102c formed on the side surface (thickness surface) of the polymer 104 is smaller than the thickness of the conductive material 102a formed on the surface of the polymer film 101 and the thickness of the conductive material 102d formed on the surface of the polymer 104.

As such, the conductive material 102 may include a small thickness portion 102c formed along a direction vertical to a surface direction of the polymer film 101.

In the case of the current collector 100 for the electrode according to another embodiment of the present invention, the relatively small thickness portion 102c of the conductive material 102 exists and the small thickness portion 102c of the conductive material 102 is easily completely corroded or broken along the thickness direction over the entire thickness thereof when the short circuit occurs. As a result, since the resistance increases in this portion, it is possible to block the path of the short-circuit current.

As such, the conductive material 102 of the current collector 100 for the electrode according to another embodiment of the present invention exhibits an electrochemical fuse function or a short-circuit current blocking function in the relatively small thickness portion 102c to prevent the temperature of the battery from rising and block the short-circuit current when the short circuit occurs, thereby securing the safety of the battery.

In the case of FIGS. 7 and 8, the small thickness portion 102c of the conductive material 102 may be formed at a thickness of 70% or less compared to the thicknesses of other portions 102a and 102d. Referring to FIG. 7, if the thickness of the small thickness portion 102c of the conductive material 102 is T3 and the thicknesses of the large thickness portions 102a and 102d are T4, the conductive material 102 may be preferably formed to have T3/T4 of 0.7 or less. In addition, the small thickness portion 102c of the conductive material 102 is preferably formed to have a thickness of 0.4 µm or less.

Table 1 below shows experimental results of measuring whether the temperature rises during an external short circuit according to the thickness of the small thickness portion 102c of the conductive material 102.

A battery actually used in the experiment was manufactured to have approximately 350 to 400 mAh, and lithium cobalt oxide (LCO) was used as a positive electrode active material, and graphite was used as a negative electrode active material. A PE single layer (7 µm) was applied as the separator, and an electrolyte was applied in the form of EC/EMC 1.1M LiPF6 added with VS, FEC, PS, and SN.

TABLE 1

| | Thickness of T4 | Thickness of T3 | Temperature rise during external short circuit | Thickness of T5 |
|---|---|---|---|---|
| Condition 1 | 0.5 µm | 0.3 to 0.35 µm | None | 12 µm embossed |

TABLE 1-continued

|  | Thickness of T4 | Thickness of T3 | Temperature rise during external short circuit | Thickness of T5 |
|---|---|---|---|---|
| Condition 2 | 0.6 μm | 0.35 to 0.4 μm | None | 12 μm embossed |
| Condition 3 | 1.0 μm | To 0.4 μm | None | 20 μm embossed |

As can be seen from Table 1, it can be seen that when the thickness T3 of the small thickness portion 102c of the conductive material 102 is 0.4 μm or less, there is no temperature rise of the lithium secondary battery even when an external short circuit (to 60 mOhm) occurs. This is because when the external short circuit occurs, while the conductive material 102 is completely corroded or broken over the entire thickness in the relatively small thickness portion 102c of the conductive material 102, the resistance increases, so that the short-circuit current is blocked.

When the conductive material 102 illustrated in FIGS. 7 and 8 is viewed from the top, the conductive material 102c formed on the stepped portion 101b or the edge (side) of the polymer 104 has a quadrangular shape. As described with respect to FIGS. 5 and 6, the small thickness portion 102c of the conductive material 102 may be formed in a closed curve or closed polygonal shape when the conductive material 102 provided on the polymer film 101 is viewed from the top.

As illustrated in FIGS. 5 to 8, the polymer film 101 may include an engraved portion recessed from the surface thereof or an embossed portion protruding from the surface thereof, and the conductive material 102 may also include an engraved portion 102b recessed from the surface thereof or embossed portions 102c and 102d protruding from the surface thereof. The conductive materials 102c formed on the side surfaces (thickness surfaces) of the embossed portions 102c and 102d have a smaller thickness than other portions. That is, the conductive material 102b formed on the horizontal surface of the engraved portion of the polymer film 101 or the conductive material 102c formed on the vertical surface of the embossed portion may be formed to be thinner than other portions.

On the other hand, instead of forming the stepped portion 101b on the polymer film 101, an engraved pattern is formed or scratched on the surface of the polymer film 101 coated or deposited with the conductive material 102 and then the conductive material 102 is coated or deposited to make the small thickness portion 102b. When the engraved pattern is formed or scratched on the surface of the polymer film 101, a vertical surface in a depth direction exists as the portion thereof is recessed. The conductive material 102 applied on such a vertical surface becomes thinner than other portions, and the conductive material 102 formed with a small thickness may be broken or corroded over the entire thickness thereof when the short circuit occurs, thereby blocking the path of the short-circuit current.

As described above, in the current collector 100 for the electrode according to the present invention, the relatively small thickness portions 102b and 102c exist in the conductive material 102 provided on the polymer film 101, and when the short circuit occurs, the small thickness portions 102b and 102c may exhibit an electrochemical fuse function or a short-circuit current blocking function, thereby blocking the short-circuit current path.

Figure 9:
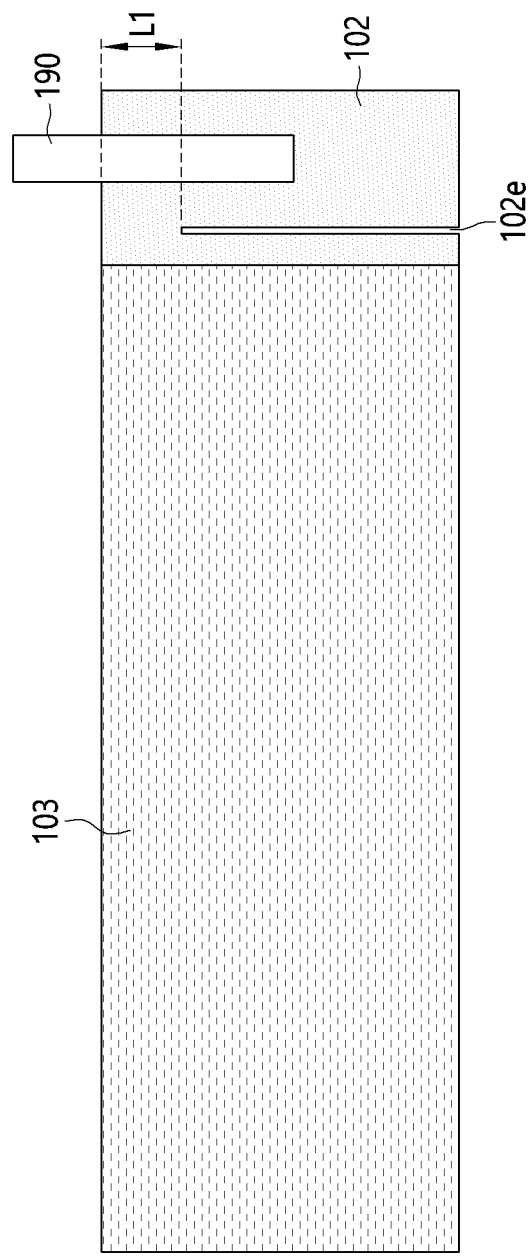
FIGS. 9 and 10 are plan views illustrating a current collector for a comparative electrode for comparison of short-circuit current blocking performance and a current collector for an electrode according to another embodiment of the present invention.
Figure 10:
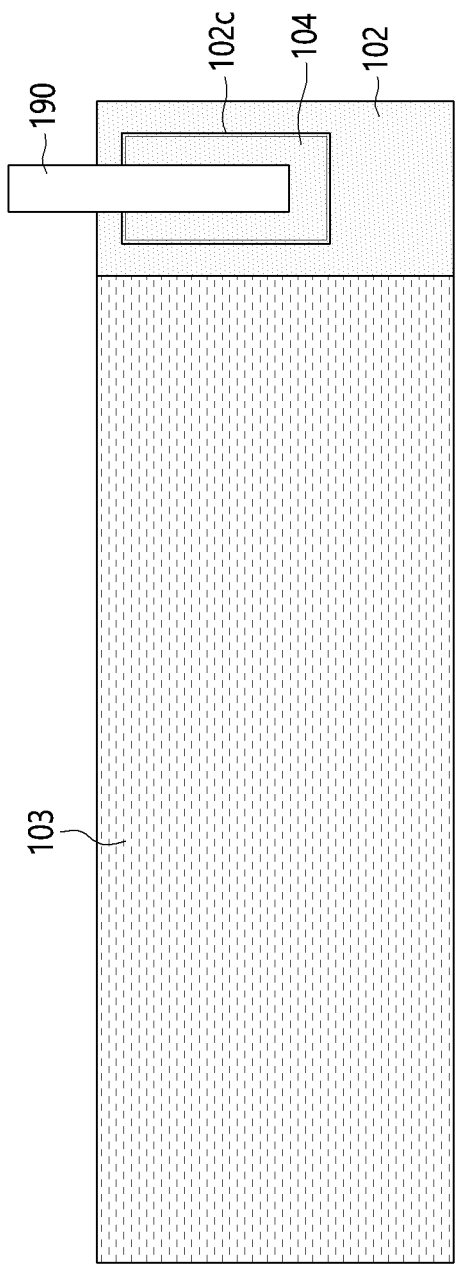

The inventors of the present invention conducted an external short-circuit test, etc. on the lithium secondary battery including the current collector for the electrode illustrated in FIGS. 9 and 10 in order to confirm the safety according to the thickness of the conductive material. As a result, it was confirmed that the current collector 100 for the electrode according to the present invention may secure the safety of the battery through the small thickness portion of the conductive material 102. Hereinafter, external short-circuit test results will be described with reference to FIGS. 9 to 13.

Figure 11:
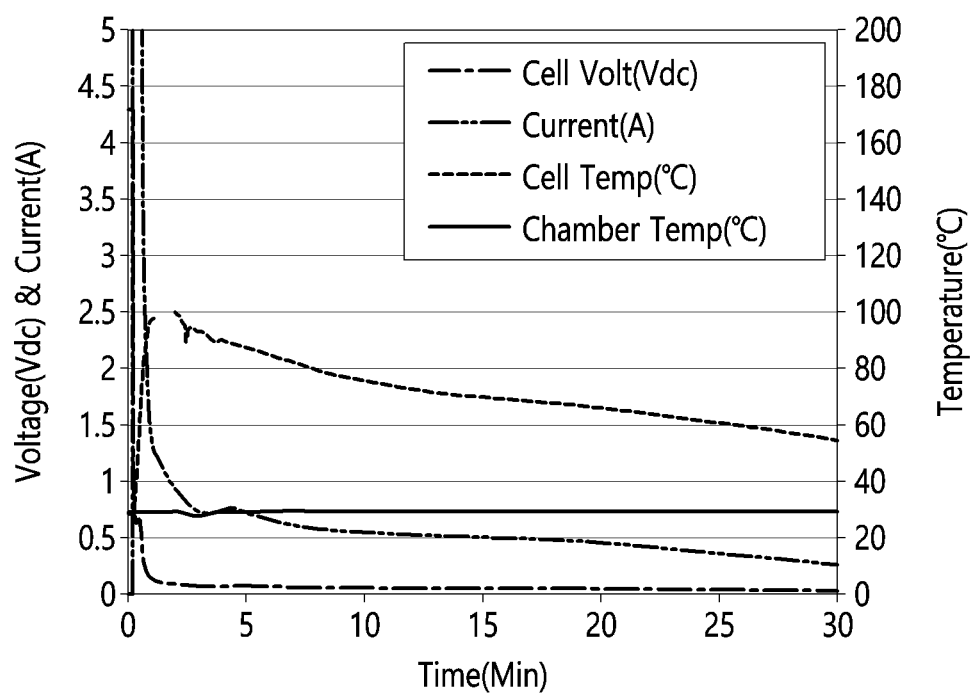
FIGS. 11 to 13 are testing results obtained by comparing changes in voltage and temperature during an external short circuit with respect to a lithium secondary battery including the current collector for the comparative electrode and a lithium secondary battery including the current collector for the electrode according to another embodiment of the present invention.
Figure 12:
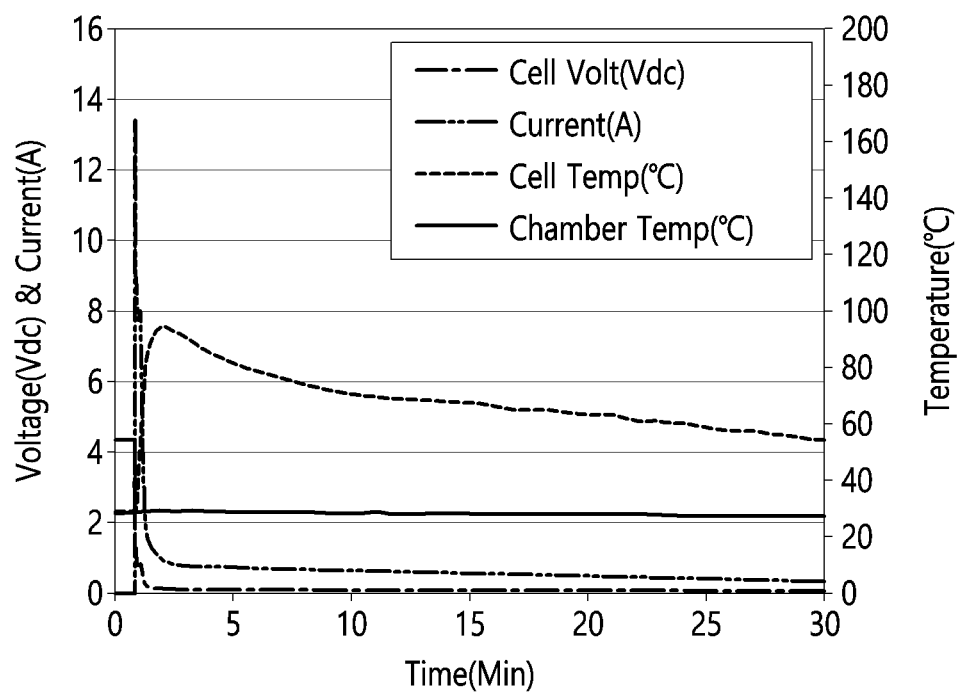
Figure 13:
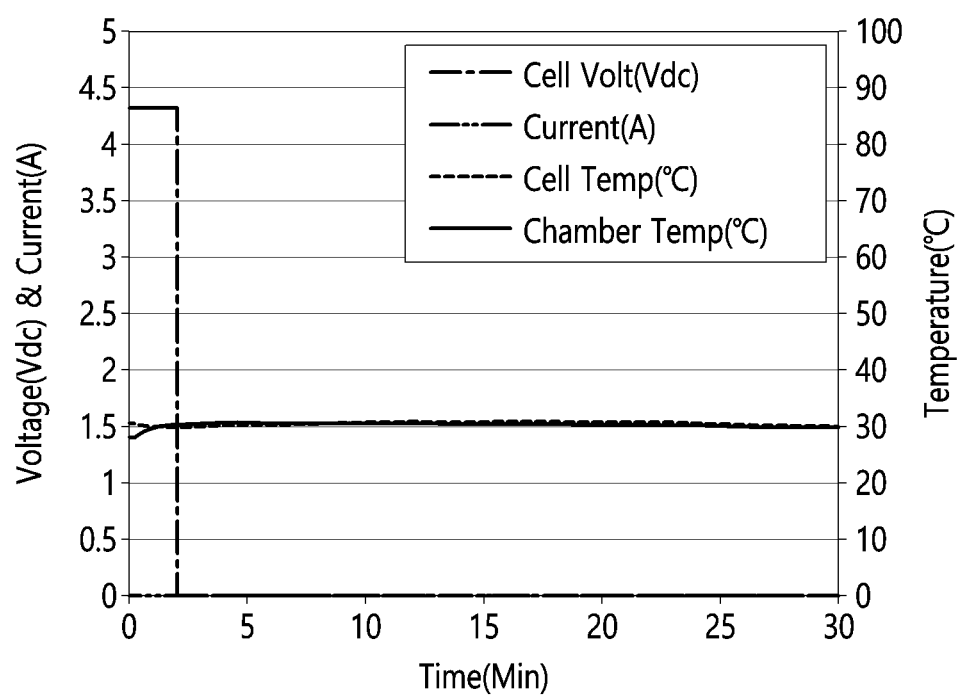

FIGS. 9 and 10 are plan views illustrating a current collector for a comparative electrode for comparison of short-circuit current blocking performance and a current collector for an electrode according to another embodiment of the present invention, and FIGS. 11 to 13 are testing results obtained by comparing changes in voltage and temperature during an external short circuit with respect to a lithium secondary battery including the current collector for the comparative electrode and a lithium secondary battery including the current collector for the electrode according to another embodiment of the present invention.

The inventors of the present invention prepared a current collector for an electrode with reduced area or current path length of the conductive material (see FIG. 9) and a current collector for an electrode with reduced thickness of the conductive material (see FIG. 10) as a method of reducing the current path.

The current collector for the electrode illustrated in FIG. 9 is welded to both surfaces of the polymer film with the lead tab 190 to electrically connect the lead tab 190 and the conductive material 102. PET is used as the polymer film, and the thickness thereof is 7 μm, and as the conductive material 102, aluminum is coated at a thickness of 0.6 μm or less. A portion 102e of the conductive material 102 positioned between the positive electrode active material 103 and the lead tab 190 is removed to reduce the current path. At this time, a length L1 of the remaining portion of the conductive material 102 is set to be 5 mm and 10 mm That is, the length L1 of the current path is 5 mm and 10 mm. In the current collector for the electrode according to FIG. 9, the thickness of the conductive material 102 is not reduced, but only the length of the current path is reduced.

The current collector for the electrode illustrated in FIG. 10 is the current collector 100 for the electrode according to another embodiment of the present invention illustrated in FIG. 8. That is, the current collector for the electrode is a current collector for an electrode in which the polymer 104 is bonded to the polymer film 101, and the conductive material 102 is coated in the state before coating the aluminum conductive material 102 on the surface of the polymer film 101. Here, PET is used as the polymer 104 and the thicknesses of the polymer 104 and the adhesive (not illustrated) are 12 μm. Here, the small thickness conductive material 102c may be formed on the side surface of the polymer 104 (same as condition 2 of Table 1).

FIGS. 11 and 12 illustrate external short-circuit test results of a secondary battery including a current collector for an electrode having a length L1, 5 mm and 10 mm, of the conductive material 102, that is, the length L1 of the current path of the remaining portion in the current collector for the electrode according to FIG. 9, respectively, and FIG. 13 is an external short-circuit test result of the secondary battery including the current collector for the electrode according to FIG. 10. Here, the secondary battery used in the test is a pouch-type secondary battery having a capacity of 350 to 400 mAh using a PE separator having a thickness of 7 μm.

Referring to FIGS. 11 and 12, it can be seen that when the thickness of the conductive material 102 provided on the polymer film 101 is not reduced and only the length L1 of the current path is reduced, the current is not blocked when the short circuit occurs, but the temperature of the battery is rapidly increased.

On the other hand, referring to FIG. 13, it can be seen that when the conductive material 102 provided on the polymer film 101 has the small thickness portion 102c, the resistance increases when the short circuit occurs, so that the short-circuit current is blocked.

As such, when the short circuit occurs in the secondary battery using the current collector 100 for the electrode according to the present invention, the small thickness portions 102b and 102c of the conductive material 102 are broken or corroded over the entire thickness, thereby blocking the short-circuit current. As a result, it is possible to prevent the explosion and the like of the battery and to secure the safety of the battery.

As described above, the present invention has been described by specified matters such as detailed components, and the like and limited embodiments and drawings, but the description is just provided to assist more overall understanding of the present invention and the present invention is not limited to the embodiment and various modifications and changes can be made by those skilled in the art from such a disclosure. Therefore, the spirit of the present invention should not be defined only by the described embodiments, and it should be appreciated that claims to be described below and all which are equivalent to the claims or equivalently modified to the claims are included in the scope of the spirit of the present invention.

The invention claimed is:

1. A current collector for an electrode, comprising:
a polymer film; and
a conductive material provided on at least one surface of an upper surface or a lower surface of the polymer film,
wherein the conductive material includes a first thickness portion and a second thickness portion larger than the first thickness portion,
wherein the first thickness portion of the conductive material is disposed on a horizontal surface of an engraved portion of the polymer film or on a vertical surface of an embossed portion of the polymer film,
wherein the engraved portion is recessed from a first surface of the polymer film and the embossed portion protrudes from a second surface of the polymer film,
wherein the conductive material disposed on the horizontal surface of the engraved portion or the conductive material disposed on the vertical surface of the embossed portion is thinner than the conductive material disposed on other portions of the polymer film, and
wherein, when a short circuit occurs, the first thickness portion of the conductive material is broken or corroded therethrough along a thickness direction thereof to increase a resistance, thereby performing an electrochemical fuse function or a short-circuit current blocking function.

2. The current collector for the electrode of claim 1, wherein the embossed portion protruding from the second surface of the polymer film includes a stepped portion disposed on the polymer film or includes a polymer attached to the second surface of the polymer film.

3. The current collector for the electrode of claim 1, wherein the first thickness portion of the conductive material has a thickness of 70% or less as compared with a thickness of other portions thereof.

4. The current collector for the electrode of claim 1, wherein the first thickness portion of the conductive material has a thickness of 0.4 µm or less.

5. The current collector for the electrode of claim 1, wherein the first thickness portion of the conductive material is formed in a closed curve or closed polygonal shape when the conductive material provided on the polymer film is viewed from a top.

* * * * *